(12) United States Patent
Abe et al.

(10) Patent No.: US 11,599,014 B2
(45) Date of Patent: Mar. 7, 2023

(54) PROJECTION DIRECTION CHANGE DEVICE AND IMAGE PROJECTION SYSTEM

(71) Applicant: Panasonic Intellectual Property Management Co., Ltd., Osaka (JP)

(72) Inventors: Takaaki Abe, Osaka (JP); Ken Mashitani, Osaka (JP); Junji Masumoto, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 78 days.

(21) Appl. No.: 17/197,743

(22) Filed: Mar. 10, 2021

(65) Prior Publication Data

US 2021/0286250 A1    Sep. 16, 2021

(30) Foreign Application Priority Data

Mar. 11, 2020 (JP) .............................. JP2020-041942

(51) Int. Cl.
*G03B 21/28* (2006.01)
*H04N 9/31* (2006.01)
*G02B 7/182* (2021.01)
*G03B 21/14* (2006.01)

(52) U.S. Cl.
CPC ........... *G03B 21/28* (2013.01); *G02B 7/1821* (2013.01); *G03B 21/142* (2013.01); *H04N 9/317* (2013.01)

(58) Field of Classification Search
CPC .... G03B 21/28; G03B 21/142; G02B 7/1821; H04N 9/317
See application file for complete search history.

(56) References Cited

U.S. PATENT DOCUMENTS

| | | | |
|---|---|---|---|
| 9,239,636 B1* | 1/2016 | S | .............................. G03B 5/00 |
| 2002/0122161 A1 | 9/2002 | Nishida et al. | |
| 2005/0275931 A1* | 12/2005 | Patel | ....................... B81C 3/001 |
| | | | 359/291 |
| 2017/0134702 A1 | 5/2017 | Hashi | |
| 2017/0264873 A1* | 9/2017 | Muramatsu | .......... H04N 9/3185 |
| 2019/0196176 A1 | 6/2019 | Yamada | |

FOREIGN PATENT DOCUMENTS

| | | |
|---|---|---|
| JP | 2-47637 | 3/1990 |
| JP | 2002-262198 | 9/2002 |
| JP | 2003-43385 | 2/2003 |
| JP | 2007-47436 | 2/2007 |
| JP | 2009-98253 | 5/2009 |
| JP | 2011-150160 | 8/2011 |
| JP | 2015-31932 | 2/2015 |
| JP | 2017-90901 | 5/2017 |
| JP | 2019-113605 | 7/2019 |

* cited by examiner

*Primary Examiner* — Michael E Teitelbaum (74) *Attorney, Agent, or Firm* — Wenderoth, Lind & Ponack, L.L.P.

(57) ABSTRACT

A projection direction change device includes a mirror that reflects light emitted from a projection lens unit of a projector, a mirror support part that rotatably supports the mirror around a first axis and a second axis, a first drive part that rotary drives the mirror around the first axis, and a second drive part that rotary drives the mirror around the second axis. An intersecting point of the first and second axes is positioned closer to the projection lens unit than a geometric barycenter of the mirror is.

14 Claims, 12 Drawing Sheets

PROJECTION DIRECTION CHANGE DEVICE AND IMAGE PROJECTION SYSTEM

BACKGROUND

1. Technical Field

The present disclosure relates to a projection direction change device that changes the projection direction of an image projected from a projector.

2. Description of the Related Art

A projection direction change device, also called a moving mirror, changes the projection direction of an image projected from a projector and allows the image to be projected in widespread directions. If a projector is installed under some constraints or is heavy, it is effective to change the projection direction of an image using a projection direction change device.

In patent literature (PTL) 1, a mirror is disposed between the lens of the projection optical system of a projector and a screen, and the projection direction of the image is changed by the mirror to further correct the distortion of the image.

PTL1 is Japanese Patent Unexamined Publication No. 2002-262198.

Attempting to project a projection image in widespread directions by increasing the inclination angle of the mirror, however, requires a large mirror, which may undesirably be in contact with the projection lens unit of the projector.

SUMMARY

An object of the present disclosure is to provide a projection direction change device and an image projection system that largely change the range of projection directions with a limited increase of the sizes of the device and the system.

A projection direction change device of the present disclosure includes a mirror that reflects light emitted from a projection lens unit of a projector, a mirror support part that rotatably supports the mirror around a first axis and a second axis, a first drive part that rotary drives the mirror around the first axis, and a second drive part that rotary drives the mirror around the second axis, where an intersecting point of the first and second axes is positioned closer to the projection lens unit than a geometric barycenter of the mirror is.

An image projection system of the present disclosure includes the above-described projection direction change device having a mirror controller that indicates a drive amount of the mirror to the first and second drive parts, the projector that projects an image, an image output device that outputs an image to the projector, and a controller that sends a command signal about the attitude of the mirror to the mirror controller and outputs an image output signal synchronized with the command signal to the image output device.

A projection direction change device and an image projection system largely change the range of projection directions while limiting an increase of the sizes of the device and system.

DETAILED DESCRIPTION

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure, and it is not intended that the drawings and the description limit the subjects described in the claims.

Figure 1:
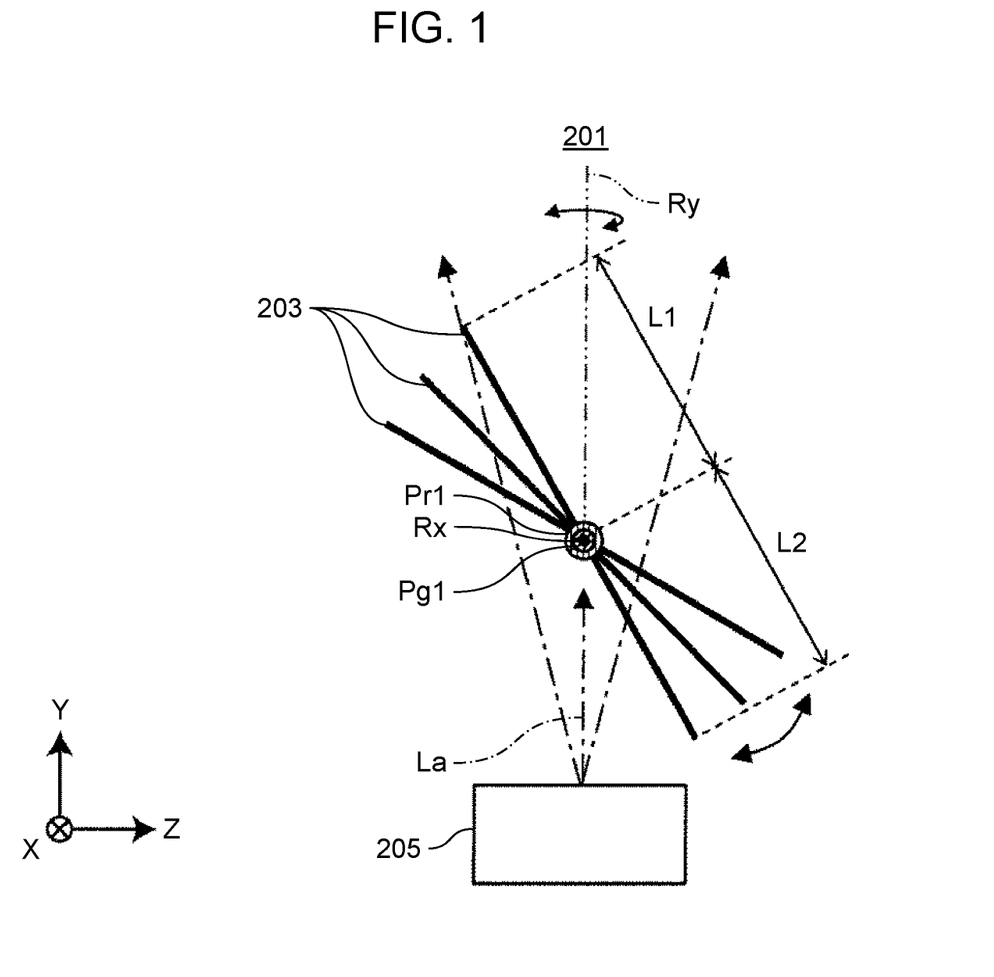
FIG. 1 is an outline sectional view of a projection direction change device as a comparative example.
Figure 2:
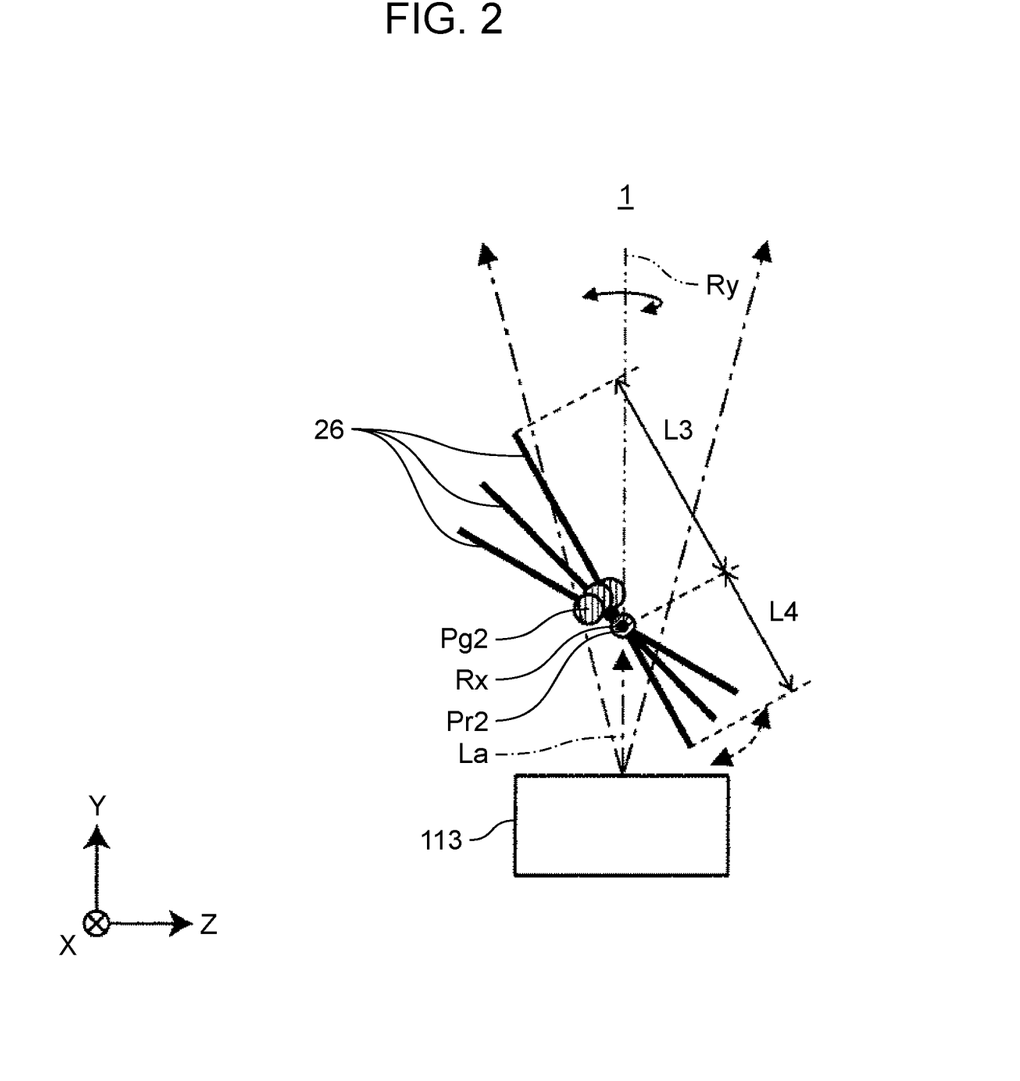
FIG. 2 is an outline sectional view of a projection direction change device of the present disclosure.

A rough description is made of the difference between projection direction change device 201 as a comparative example and projection direction change device 1 of the present disclosure in reference to FIGS. 1 and 2. FIG. 1 is an outline sectional view of projection direction change device 201 as a comparative example. FIG. 2 is an outline sectional view of projection direction change device 1 of the present disclosure.

As shown in FIG. 1, mirror 203 as a comparative example is capable of pan rotation with the Y-axis direction being rotation axis Ry (the first axis) and tilt rotation with the X-axis direction being rotation axis Rx (the second axis).

Mirror 203 is supported so that geometric barycenter Pg1 of mirror 203 (uniform in weight across the mirror surface) is positioned equal to intersecting point Pr1 of the two rotation axes of pan rotation and tilt rotation of mirror 203.

Distance L1 from the end of mirror 203 opposite to projection lens unit 205 to intersecting point Pr1 of the two rotation axes is roughly the same as distance L2 from intersecting point Pr1 to the end of mirror 203 closer to projection lens unit 205. In this case, projection lens unit 205 must be spaced from intersecting point Pr1 of the two rotation axes to the degree that the end of mirror 203 closer to projection lens unit 205 does not interfere with projection lens unit 205 while tilt rotation around rotation axis Rx is driven. Intersecting point Pr1 of the two rotation axes is disposed on optical axis La of light emitted from projection lens unit 205. This prolongs the distance from the region of mirror 203 opposite to projection lens unit 205 to projection lens unit 205, and an image projected from projection lens unit 205 is magnified and is projected into the region of mirror 203 opposite to projection lens unit 205. Accordingly, the size of mirror 203 needs to be increased in order that the whole light projected from projection lens unit 205 is projected onto mirror 203.

In projection direction change device 1 of the present disclosure, on the other hand, intersecting point Pr2 of the two rotation axes is positioned closer to projection lens unit 113 than geometric barycenter Pg2 of mirror 26 is. Distance L4 from intersecting point Pr2 to the end of mirror 26 closer to projection lens unit 113 is shorter than distance L3 from the end of mirror 26 opposite to projection lens unit 113 to intersecting point Pr2 of the two rotation axes. This shortens the distance from the region of mirror 26 opposite to projection lens unit 113 to projection lens unit 113 even if projection lens unit 113 is spaced from intersecting point Pr2 of the two rotation axes to the degree that the end of mirror 26 closer to projection lens unit 113 does not interfere with projection lens unit 113. This suppresses an increase of the size of an image projected into the region of mirror 26 opposite to projection lens unit 113. Accordingly, mirror 26 can be downsized, and so can projection direction change device 1 and image projection system 100 (refer to FIG. 8). Note that rotation axis Ry can be parallel-translated in direction Z, where the intersecting point of a straight line vertically projected onto the surface of mirror 26 standing up from rotation axis Ry and rotation axis Rx is to be intersecting point Pr2.

First Exemplary Embodiment

Hereinafter, a description is made of the first exemplary embodiment as an example of above-described projection direction change device 1 in reference to FIGS. 3 through 7.

1-1. Configuration

Figure 3:
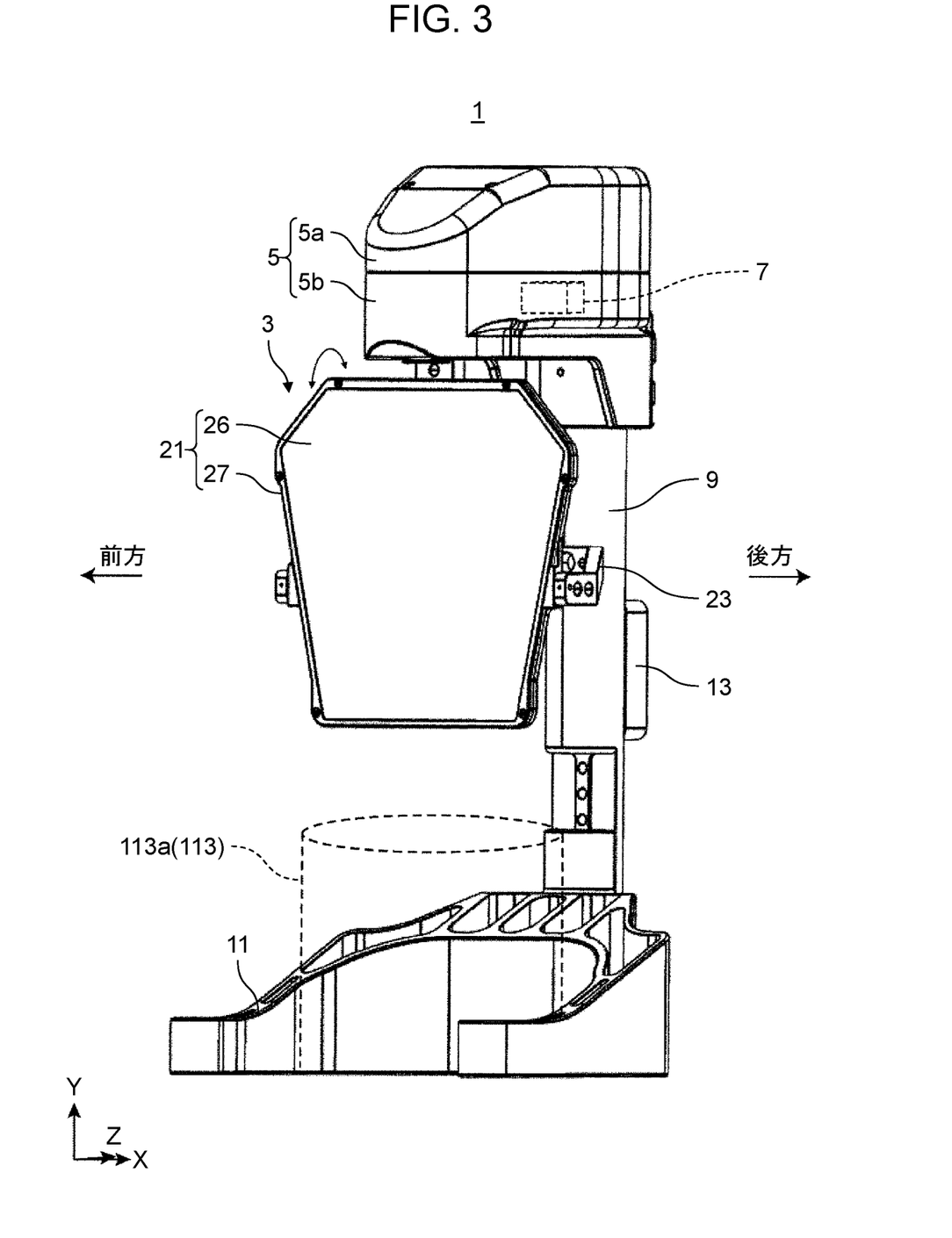
FIG. 3 is a perspective view of a projection direction change device according to the first exemplary embodiment of the present disclosure, viewed from the front.
Figure 4:
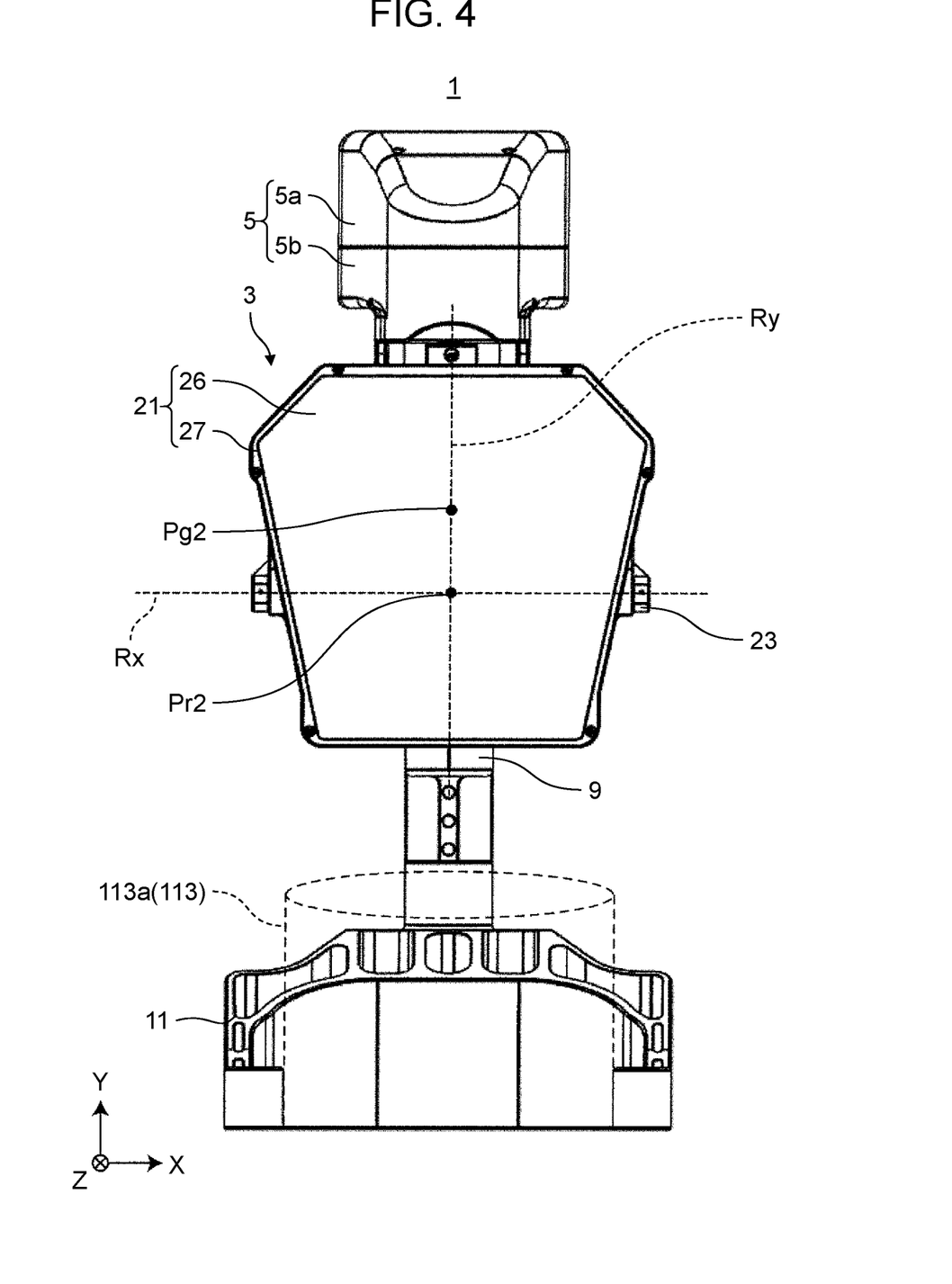
FIG. 4 is a front view of the projection direction change device, viewed from the front.
Figure 5:
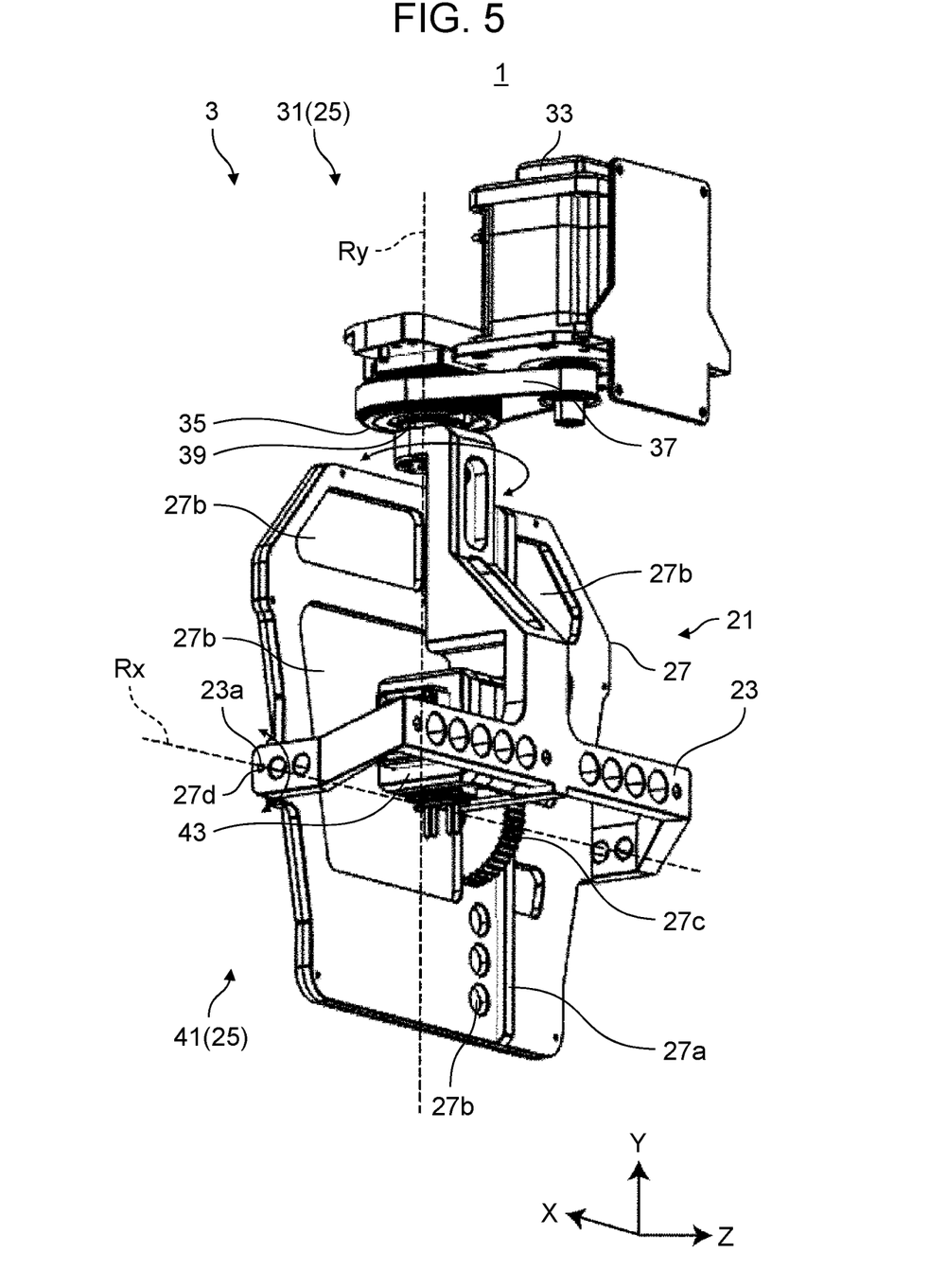
FIG. 5 is a perspective view of the mirror unit, viewed from the back.

FIG. 3 is a perspective view of projection direction change device 1 according to the first exemplary embodiment of the present disclosure, viewed from the front. FIG. 4 is a front view of projection direction change device 1, viewed from the front. FIG. 5 is a perspective view of mirror unit 3, viewed from the back. For convenience of the following description, each figure is assumed to be based on the XYZ rectangular coordinate system shown in the figure. Note that the reflection direction of mirror 26 is front in a state where mirror 26 is not rotating.

Projection direction change device 1 changes the projection direction of light projected from projection lens unit 113 of projector 111. Projection direction change device 1 includes mirror unit 3, head case part 5 composed of first case 5a and second case 5b, mirror controller 7, support 9, attaching part 11, and connector 13.

Mirror unit 3 includes mirror part 21 that reflects light projected from projection lens unit 113, mirror support part 23 that rotatably supports mirror part 21, and mirror driver 25 that rotary drives mirror part 21. Note that, in projector 111, projection lens unit 113 that projects an image displayed by image display device 115 (refer to FIG. 9) is composed of multiple lens groups.

Mirror part 21 includes mirror 26 that reflects light projected from projection lens unit 113 and mirror frame 27 fitted onto the outer edge of mirror 26. Mirror 26 has a hexagonal shape for example, where it may have a polygonal shape (at least a triangular shape) and its outer edge may be curved. Mirror 26 has a wider region opposite to projection lens unit 113 than the region closer to projection lens unit 113. For example, mirror 26 has a shape formed by two trapezoids combined to each other with one side common, where the side closer to projection lens unit 113 of mirror 26 is shorter than the side opposite to projection lens unit 113. Mirror 26, for example, has a shape in which the region expands outward from the side closer to projection lens unit 113 and then the region contracts inward. Mirror 26 may have any one of the shapes: planar, concave, and convex.

Figure 6:
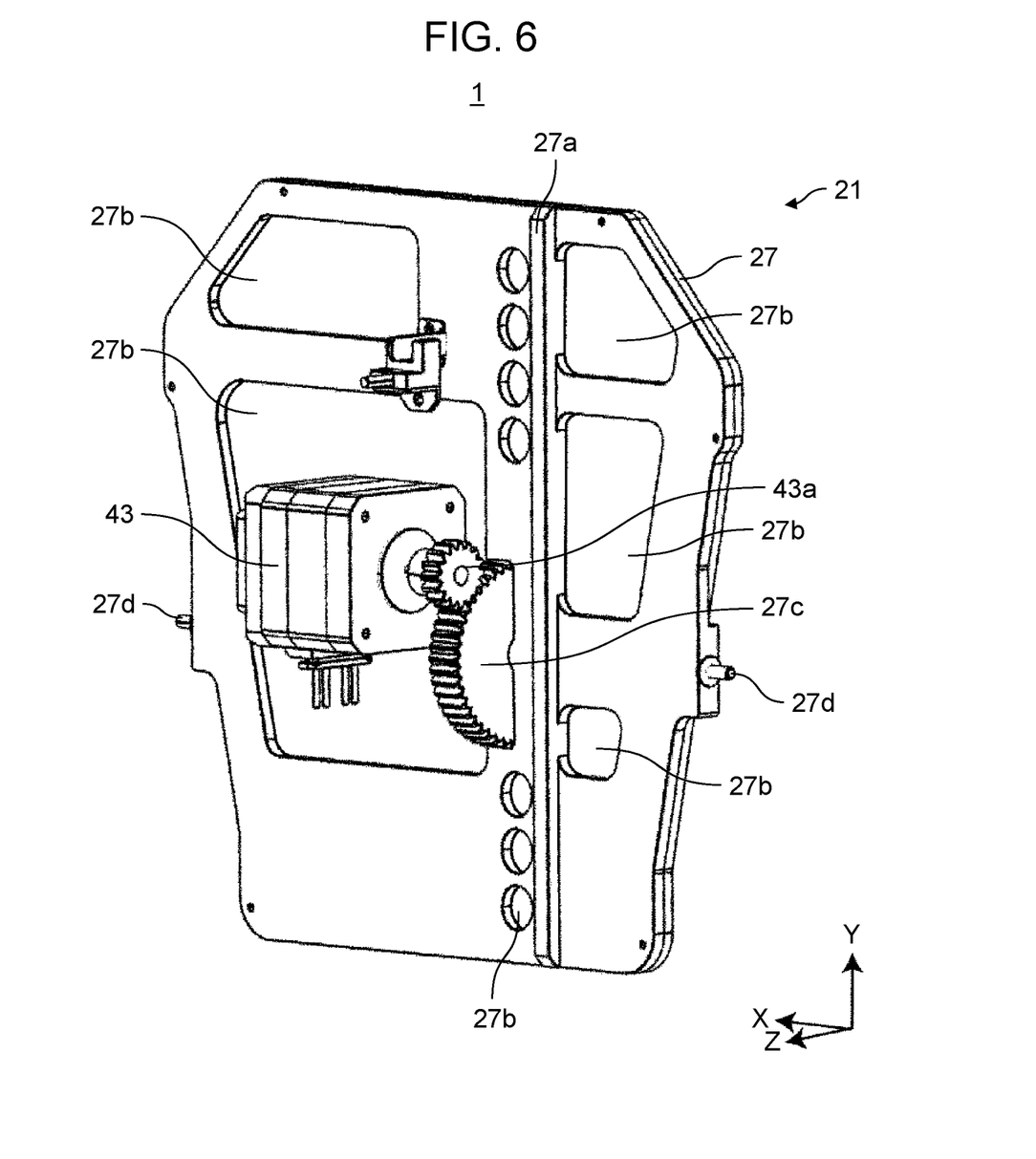
FIG. 6 is a perspective view of the mirror frame, viewed from the back.
Figure 7:
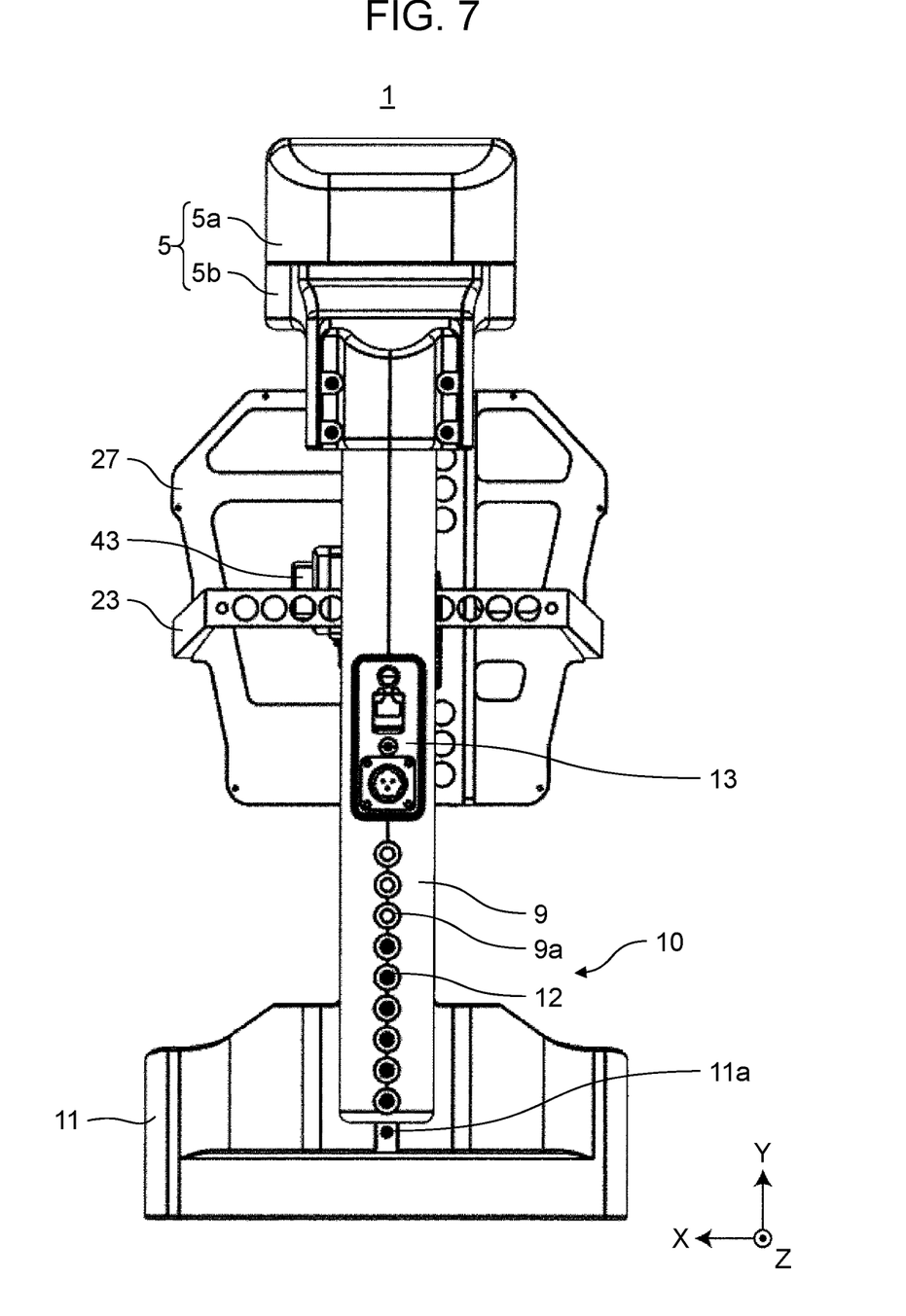
FIG. 7 is a back view of the projection direction change device, viewed from the back.

Mirror frame 27 is rotatably supported by mirror supporting part 23 around the X and Y axes. Mirror frame 27 has rib 27a and multiple through holes 27b formed so that the barycenter of mirror part 21 (formed by unifying mirror 26 and mirror frame 27) is positioned on intersecting point Pr2 of the two axes: the support shaft (coincident with rotation axis Rx) of mirror frame 27 at mirror support part 23 and rotation axis Ry of mirror support part 23. Also, mirror frame 27 has first gear 27c (like a semicircular plate) formed on the back surface. The weight of mirror part 21 is adjusted by rib 27a, through holes 27b, and first gear 27c. Through hole 27b of a larger region is formed opposite to projection lens unit 113 than closer to projection lens unit 113 of mirror frame 27, and thus the barycenter of mirror frame 27 is positioned closer to projection lens unit 113 than geometric barycenter Pg2 of mirror 26 is.

Mirror frame 27 has two pins 27d extending outward from the outer edge. Each of two pins 27d is rotatably inserted into hole 23a provided at the tip of mirror support part 23. The two pins function as rotation axis Rx of tilt rotation.

Mirror driver 25 includes first drive part 31 that rotary drives mirror part 21 around the Y axis and second drive part 41 that rotary drives mirror part 21 around the X axis.

First drive part 31 changes the inclination angle of mirror part 21 around the Y axis. First drive part 31 includes first motor 33, driven pulley 35 that is driven by the rotation of first motor 33, and belt 37 that transmits the rotation output of first motor 33 to driven pulley 35. Rotation axis 39 of driven pulley 35, connected with mirror support part 23, pan-rotates mirror support part 23 in response to the rotation amount of first motor 33. Rotation axis 39 of driven pulley 35 is rotation axis Ry (the first axis). First motor 33, driven pulley 35, and belt 37 are accommodated in head case part 5. Mirror 26 supported by mirror support part 23 is rotatable (e.g., 260°) around rotation axis Ry by first motor 33. First motor 33 is electrically connected with mirror controller 7, which controls the rotation amount of first motor 33.

Second drive part 41 changes the inclination angle of mirror part 21 around the X axis. Second drive part 41 includes second motor 43. Second motor 43 has output gear 43a, which engages with first gear 27c. Second motor 43 is supported by mirror support part 23. Rotation of output gear 43a of second motor 43 rotates first gear 27c together with mirror frame 27, and mirror part 21 tilt-rotates. Mirror 26 supported by mirror support part 23 is rotatable (e.g., 0° to 90°) around rotation axis Rx (the second axis) by second motor 43. Mirror 26, thus rotatable from a state orthogonal to optical axis La to a state parallel with optical axis La, reflects projection light in a range between 0° and 90°. Note that rotation axis Ry and rotation axis Rx are orthogonalized to each other for example. Second motor 43 is electrically connected with mirror controller 7, and the rotation amount of the motor is controlled by mirror controller 7.

Mirror controller 7, connected with connector 13, is capable of receiving a command signal from the outside through connector 13. Mirror controller 7 sends a drive signal to first motor 33 and second motor 43.

Support 9 connects head case part 5 in which mirror controller 7 is accommodated with attaching part 11. The position of direction Y of support 9 is adjustable by means of adjustment mechanism 10, and thus the distance between projection lens unit 113 and mirror part 21 can be adjusted in response to the length of projection lens unit 113. This allows the length of support 9 to be adjusted in response to the length of projection lens unit 113 so that the distance between projection lens unit 113 and mirror 26 is minimized to the degree that mirror 26 in a movable state does not interfere with projection lens unit 113. This allows mirror part 21 to be disposed at a position where the spread of projection light from projection lens unit 113 is suppressed, which suppresses upsizing of mirror part 21.

Support 9 and attaching part 11 are provided with length adjustment mechanism 10 that adjusts the connection position. Support 9 has multiple through holes 9a vertically formed in the bottom of support 9. Attaching part 11 has multiple bolt holes 11a vertically formed in the surface in contact with support 9. The bottom of support 9 is slidably connected to attaching part 11. Length adjustment mechanism 10 is composed of through holes 9a, bolt holes 11a, and bolts 12. Support 9 is slided so that support 9 is at a desired height, bolts 12 are inserted in a state where through holes 9a of support 9 are aligned with bolt holes 11a of attaching part 11, and they are fastened. Note that length adjustment mechanism 10 may be of another configuration, such as a motor and a rack pinion set.

Attaching part 11 is an attachment for fastening projection direction change device 1 to projector 111. Attaching part 11 is U-shaped for example. The bottom surface of attaching part 11 is attached on the plane where projection lens unit 113 of projector 111 is disposed so that attaching part 11 encloses lens barrel 113a of projection lens unit 113. Note that attaching part 11 may be attached to lens barrel 113a of projection lens unit 113.

Connector 13, disposed on support 9, is connected with mirror controller 7. The socket of a communication cable connected with an outside control device is disposed so that the cable can be inserted into connector 13 in whatever attitude projector 111 is placed. Connector 13 is provided opposite to mirror 26 of support 9 for example. Connector 13 may be disposed on head case part 5.

Figure 8:
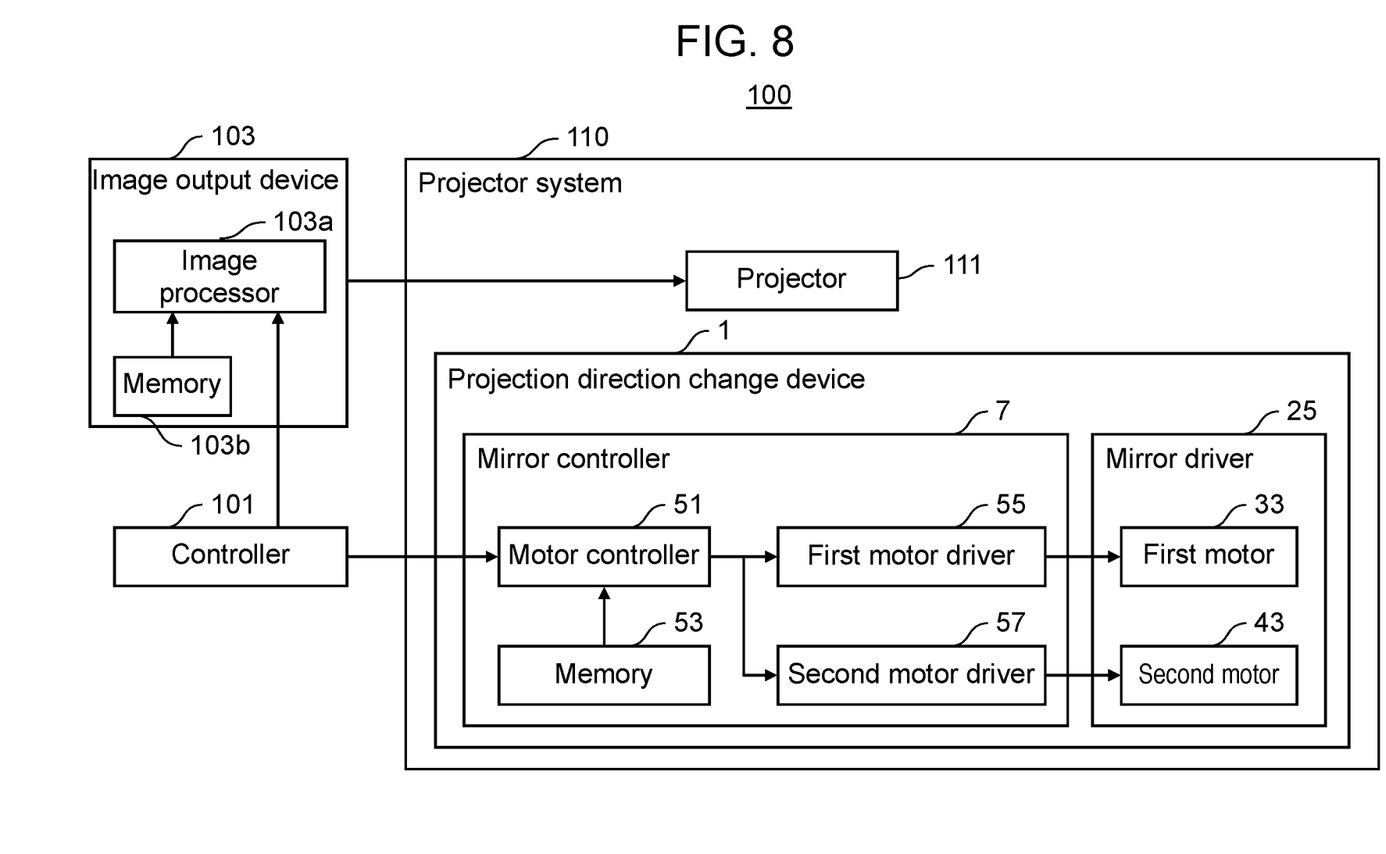
FIG. 8 is a block diagram illustrating the configuration of an image projection system.

Next, a description is made of the configuration of image projection system 100 including projection direction change device 1 in reference to FIG. 8. FIG. 8 is a block diagram illustrating the configuration of image projection system 100.

Image projection system 100 includes projector system 110, controller 101, and image output device 103, for example.

Controller 101 controls the image output to projector 111. Also, controller 101 generates a control command containing drive information, such as a target angle (pan and tilt angles) of the rotation of mirror part 21 corresponding to an image to be output, rotary drive speed, and drive acceleration, and then sends the control command to mirror controller 7 through connector 13 of projection direction change device 1.

Controller 101 can be implemented from semiconductor devices for example. Controller 101 can be composed of a microprocessor, CPU, MPU, GPU, DSP, FPGA, and ASIC, for example. The functions of controller 101 may be performed by hardware devices only, or a combination of hardware devices and software programs. Controller 101 has a storage part such as a hard disk drive (HDD), SSD, and memory. Controller 101 reads data and programs stored in the storage part and performs various types of operations to implement given functions.

Communications from controller 101 to mirror controller 7 may be serial communications (e.g., RS232C) or IP communications through a LAN. In synchronization with transmission timing of a control command from controller 101 to mirror controller 7, a control command containing drive information of mirror part 21 is output from controller 101 also to image output device 103. In synchronization with this control command, a projection image is output from image output device 103 to projector 111. Note that controller 101 and image output device 103 may be an identical device composed of one personal computer (PC) or an edge terminal, for example.

Mirror controller 7 includes motor controller 51, memory 53, first motor driver 55, and second motor driver 57. Mirror controller 7 can be implemented from semiconductor devices for example. Mirror controller 7 can be composed of a microprocessor, CPU, MPU, GPU, DSP, FPGA, and ASIC, for example. The functions of mirror controller 7 may be performed by hardware devices only, or a combination of hardware devices and software programs. Mirror controller 7 reads data and programs stored in memory 53 and performs various types of operations to implement given functions.

Motor controller 51 of mirror controller 7 transforms a control command received from controller 101 to a motor driver control signal, and sends a corresponding motor driver control signal to first motor driver 55 and second motor driver 57. Mirror controller 7 enters the initial examination mode in which the states of first motor 33, second motor 43, and the gear are monitored when projection direction change device 1 is started up (e.g., power up). Motor controller 51 sends multiple patterns of test signals to first motor driver 55 and second motor driver 57, and refers to the test results when transforming a control command to a motor driver control signal.

Note that instead of sending a control command as a command signal from controller 101 to motor controller 51, the following way may be used. That is, a mirror operation sequence composed of a sequence of a pan angle and tilt angle is stored in memory 53 of mirror controller 7 in advance, and a timing signal received from controller 101 triggers motor controller 51 to read the mirror operation sequence.

Image output device 103 outputs an image to projector 111 according to drive information from controller 101 and an image output signal specifying the type of an image to be displayed. Image output device 103 includes image processor 103a and memory 103b. Memory 103b stores multiple types of image data as a base to be output to projector 111. Image processor 103a predicts the distortion of an image at mirror part 21 referring to distortion information of a projection image and performs image correction about the direction and amount of distortion in image data as a base specified by an image output signal. Distortion information contains a control command sent from controller 101 to mirror controller 7 and information about a projection surface.

1-2. Advantages

As described above, projection direction change device 1 according to the first exemplary embodiment includes mirror 26 that reflects light emitted from projection lens unit 113 of projector 111, mirror support part 23 that rotatably supports mirror 26 around the two axes of tilt rotation and pan rotation, first drive part 31 that rotary drives mirror 26 around the rotation axis of tilt rotation, and second drive part 41 that rotary drives mirror 26 around the rotation axis of pan rotation. Intersecting point Pr2 of rotation axis Rx of pan rotation and rotation axis Ry of tilt rotation is positioned closer to projection lens unit 113 than geometric barycenter Pg2 of mirror 26 is. With this simple configuration, intersecting point Pr2 of the two rotation axes is positioned closer to projection lens unit 113 than geometric barycenter Pg2 of mirror 26 is. The distance from intersecting point Pr2 to the end of mirror 26 closer to projection lens unit 113 is shorter than the distance from the end of mirror 26 opposite to projection lens unit 113 to intersecting point Pr2 of the two rotation axes. This shortens than ever the distance from the region of mirror 26 opposite to projection lens unit 113 to projection lens unit 113 even if projection lens unit 113 is spaced from intersecting point Pr2 of the two rotation axes to the degree that the end of mirror 26 closer to projection lens unit 113 does not interfere with projection lens unit 113. This suppresses an increase of the size of an image projected into the region of mirror 26 opposite to projection lens unit 113 of mirror 26. This increases the rotation angle of mirror 26 to increase the range of changing projection directions of light from projection lens unit 113, and mirror 26 can be downsized, as well as projection direction change device 1 and image projection system 100.

Also, the weight balance of mirror frame 27 has been adjusted so that the barycenter of mirror part 21 (refer to FIG. 3) composed of mirror 26 and mirror frame 27 is positioned closer to intersecting point Pr2 of two rotation axes than geometric barycenter Pg2 of mirror 26 is. This reduces the drive load while mirror part 21 is rotary driven. When intersecting point Pr2 of the barycenter of mirror part 21 is positioned at intersecting point Pr2 of two rotation axes, the drive load can be minimized while mirror part 21 is rotary driven.

Second Exemplary Embodiment

Hereinafter, a description is made of the second exemplary embodiment in reference to FIG. 9.

2-1. Configuration

Figure 9:
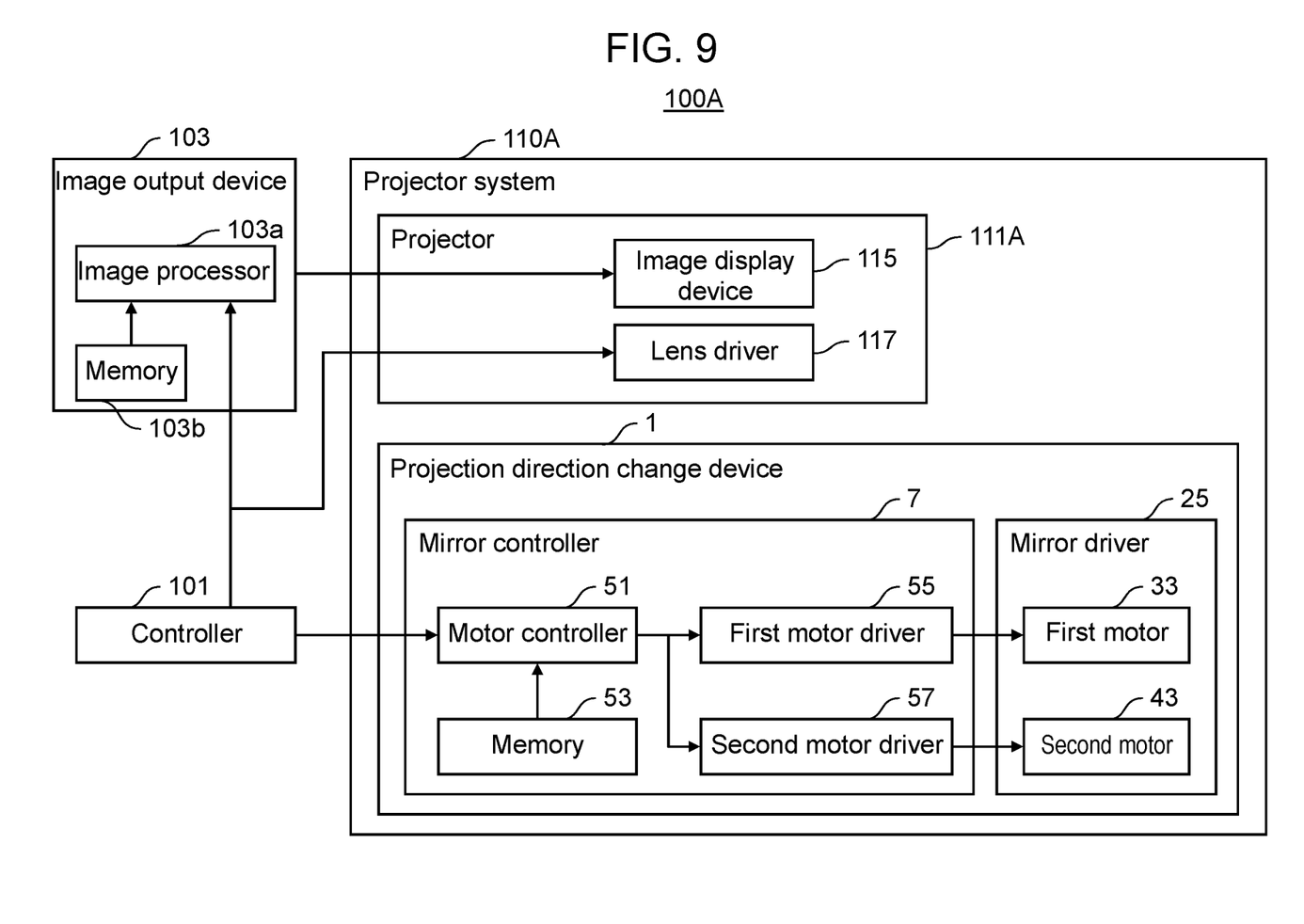
FIG. 9 is a block diagram illustrating the configuration of an image projection system according to the second exemplary embodiment of the present disclosure.

FIG. 9 is a block diagram illustrating the configuration of image projection system 100A according to the second exemplary embodiment of the present disclosure.

In image projection system 100A of the second embodiment, a makeup in which projection lens unit 113 of projector 111 is driven in conjunction with the action of an image has been added to image projection system 100 of the first embodiment. The makeups other than that described above and those described hereinafter are common between image projection system 100A of the second embodiment and image projection system 100 of the first embodiment.

Image projection system 100A includes projector system 110A, controller 101, and image output device 103. Projector system 110A includes projector 111A and projection direction change device 1.

Projector 111A includes image display device 115 and lens driver 117. Image display device 115 displays an image sent from image processor 103a. Lens driver 117 moves some or all of the lenses in projection lens unit 113 that projects an image displayed by image display device 115 along the optical axis. Lens driver 117 also shifts the optical axis. Lens driver 117 is a mechanism for zoom adjustment, focus adjustment, and shift adjustment of projection lens unit 113 for example. In the second embodiment, lens driver 117 adjusts the projection functions of the projector, including at least one of the zoom function, focus function, and shift function of projection lens unit 113, in conjunction with the rotation of mirror part 21.

Controller 101 sends a control signal for lens drive to lens driver 117 of projector 111A in synchronization with a control command to be sent to projection direction change device 1. A control signal for lens drive contains information about a zoom amount, a focus position, and a shift position of projection lens unit 113, for example. A control signal for lens drive is calculated by controller 101 according to drive information about rotary driving of mirror part 21 contained in a control command. Lens driver 117 drives some or all of the lenses in projection lens unit 113 based on a control signal for lens drive.

Controller 101 generates a control signal for lens drive with the focus position changed so that an image to be projected is in focus in a case where the projection distance changes, for example, when the projection surface (e.g., a wall) moves to another surface due to rotation of mirror part 21. Using this signal, lens driver 117 adjusts the focus amount of projection lens unit 113, which prevents an image to be projected from being out of focus even if the projection surface has changed.

Controller 101 generates a control signal for lens drive with the zoom amount adjusted in conjunction with mirror drive so that the size of a projection image does not change while mirror part 21 is rotating. Using this signal, lens driver 117 adjusts the zoom amount of projection lens unit 113, which prevents the size of a projection image from changing even when the projection distance has changed.

Controller 101 generates a control signal for lens drive for shifting the optical axis of projection lens unit 113 (multiple lenses included) so that image vignetting is minimized within the rotation range of mirror part 21 if the range is known in advance, or so that the loss of resolution due to image correction is minimized. With this signal, lens driver 117 shifts the optical axis of projection lens unit 113, which suppresses an increase of image vignetting.

Lens driver 117 thus moves the optical axes of some or all of the lenses in projection lens unit 113 along or parallel with the projection direction in synchronization with a control command sent from controller 101 to mirror controller 7 for drive-controlling mirror 26, based on a control signal for lens drive that is a command signal from controller 101. In other words, lens driver 117 adjusts the projection function of projector 111A in collaboration with drive-control of mirror 26 of projection direction change device 1 based on a command signal from controller 101. This adjustment prevents the deterioration of an image projected onto a projection surface due to a change of the projection direction by mirror 26.

Third Exemplary Embodiment

Hereinafter, a description is made of the third exemplary embodiment in reference to FIG. 10.

3-1. Configuration

Figure 10:
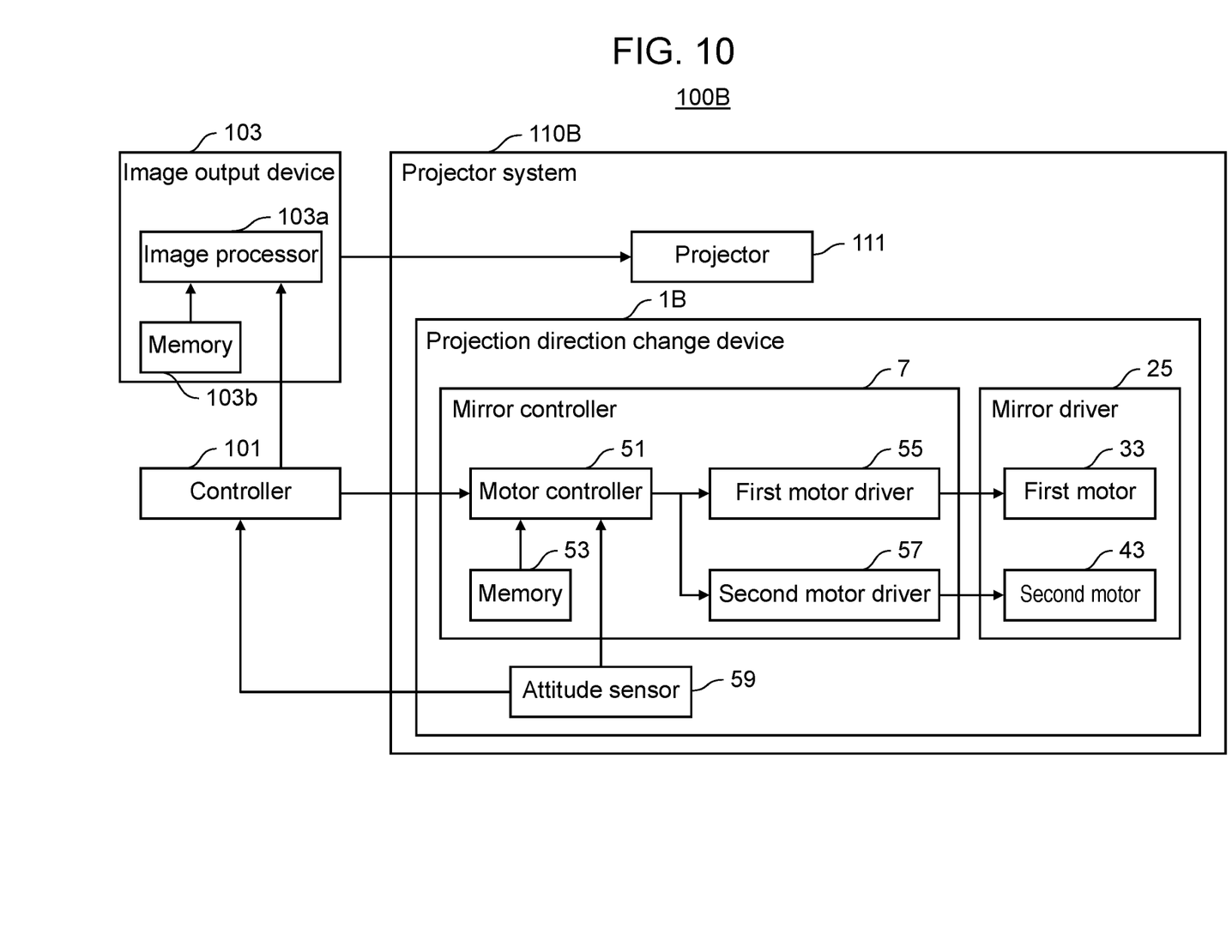
FIG. 10 is a block diagram illustrating the configuration of an image projection system according to the third exemplary embodiment of the present disclosure.

FIG. 10 is a schematic diagram illustrating the configuration of image projection system 100B according to the third embodiment of the present disclosure.

In image projection system 100B of the third embodiment, attitude sensor 59 that detects a state of the attitude of mirror part 21 has been added to projection direction change device 1 of image projection system 100 of the first embodiment. The makeups other than that described above and those described hereinafter are common between image projection system 100B of the third embodiment and image projection system 100 of the first embodiment.

Attitude sensor 59, attached to projection direction change device 1B, measures the attitude angle of mirror 26. Attitude sensor 59 is a motion sensor such as a gyro sensor. Measurement of a state of the attitude of mirror 26 by attitude sensor 59 is performed when projection direction change device 1B is started up, always, or on a user's command.

Attitude data, detected by attitude sensor 59, representing a state of the attitude of mirror part 21 is converted to a reference position at that time and a step amount of drive (e.g., pan rotation, tilt rotation) by motor controller 51, and the resulting data is used as correction data for a motor driver control signal created based on a control command. This data further increases the rotation accuracy of mirror 26.

Other Exemplary Embodiments

Hereinbefore, the description is made of the embodiments for exemplification of the technologies in the disclosure. However, these technologies are not limited to the embodiments, but are also applicable to embodiments that have undergone change, substitution, addition, and/or omission.

Figure 11:
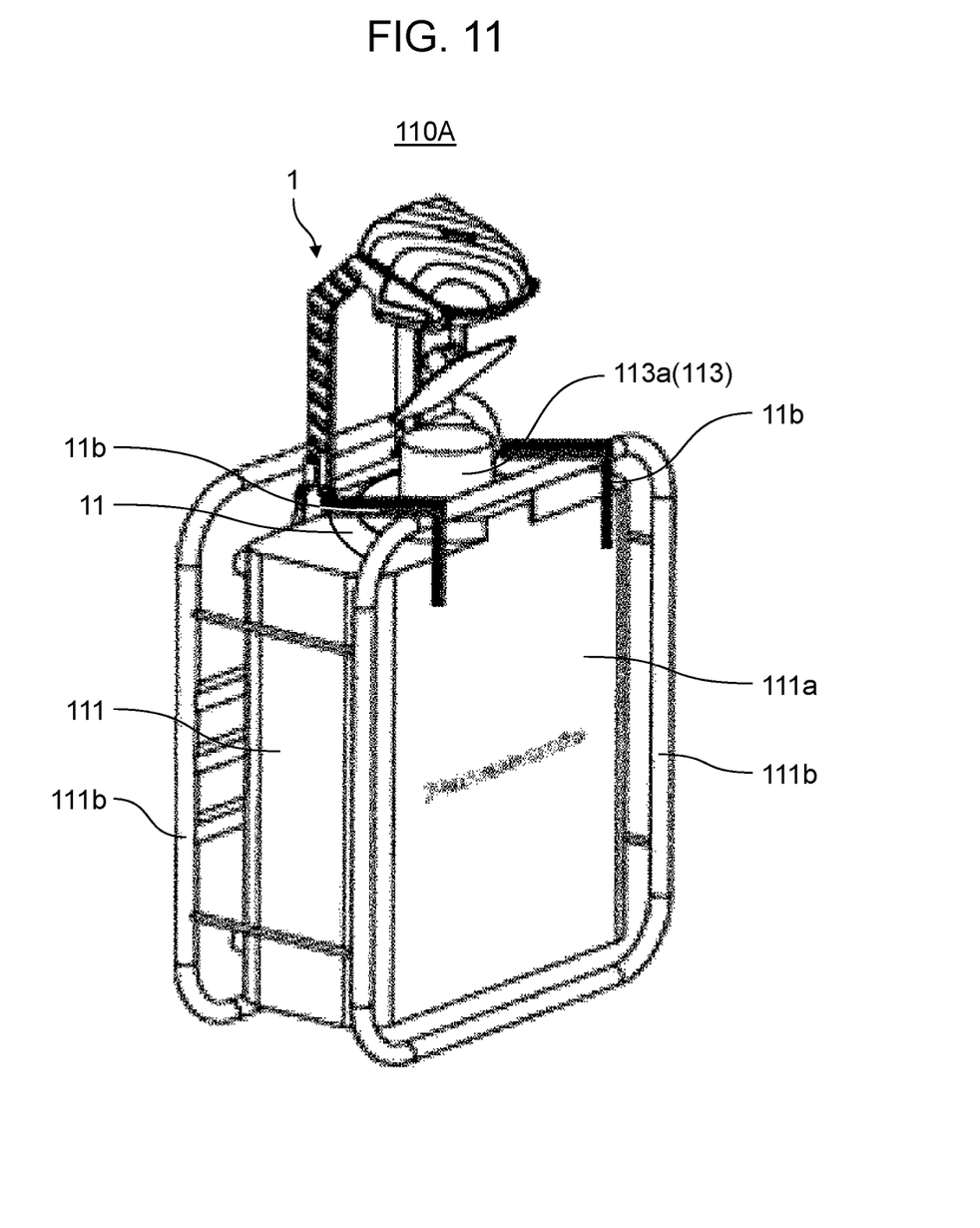
FIG. 11 is a perspective view of a projection direction change device of modified example 1 of the present disclosure.

In the above-described embodiment, attaching part 11 of projection direction change device 1 is attached to the surface of projector 111 from which lens barrel 113a of projection lens unit 113 protrudes, but the disclosure is not limited to this embodiment. For projector 111 vertically placed, like projector system 110A shown in modified example 1 of FIG. 11, arm 11b connected with attaching part 11 may be attached to side surface 111a of projector 111, in addition to the makeup in which attaching part 11 is attached to one surface of projector 111 from which lens barrel 113a protrudes. Arm 11b may be attached directly to the side surface of the main body of projector 111, or to frame 111b that supports the main body of projector 111, as shown in FIG. 11. In this way, in addition to one surface of the main body of projector 111, projection direction change device 1 attached to another surface of the main body of projector 111 or to the main body allows projection direction change device 1 to be supported by at least two surfaces of the main body of projector 111. Accordingly, projection direction change device 1 can be placed more stably. Besides, arm 11b attached to a frame supporting the main body of projector 111, instead of another surface of the main body of projector 111, provides the similar advantage.

Figure 12:
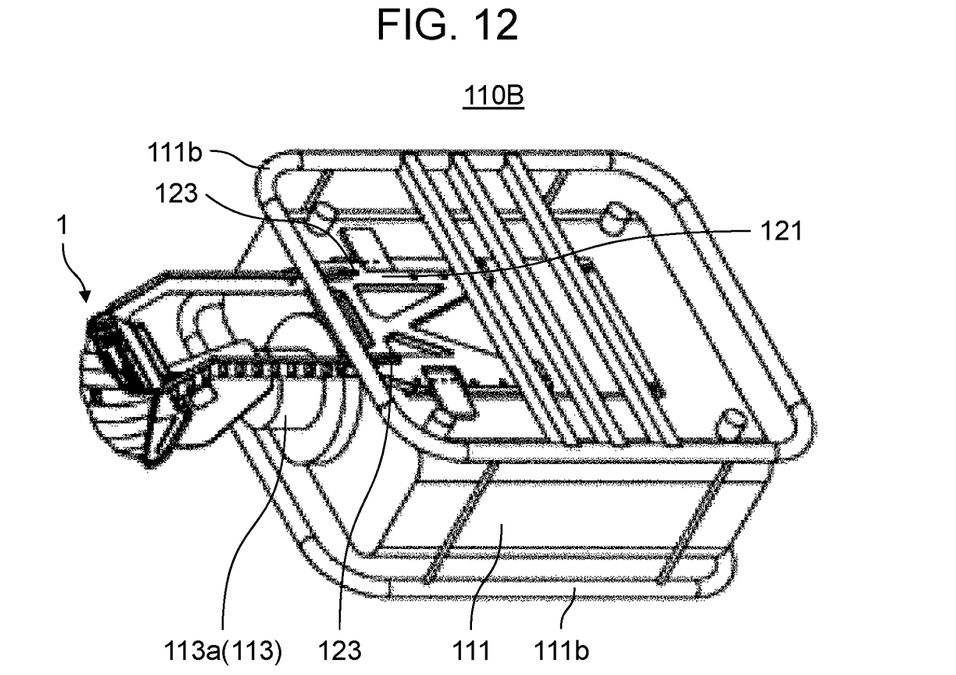
FIG. 12 is a perspective view of a projection direction change device of modified example 2 of the present disclosure.
Figure 13:
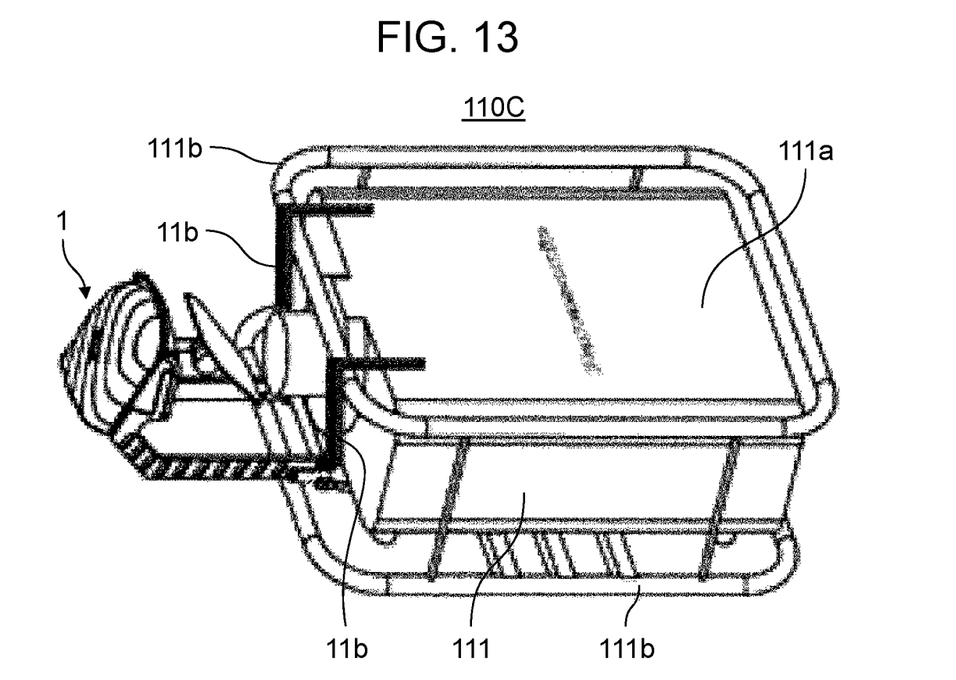
FIG. 13 is a perspective view of a projection direction change device of modified example 3 of the present disclosure.

Depending on the attitude of projector 111, projection direction change device 1 may be unstable when it is simply attached to lens barrel 113a by gravity. In this case, a support mechanism may be provided that holds or supports projection direction change device 1 of a surface of frame 111b or the main body of projector 111 vertical to the gravitational direction. For ceiling-hung projector 111 horizontally placed, like projector system 110B shown in modified example 2 of FIG. 12 for example, projection direction change device 1 may be fastened to a surface vertical to the gravitational direction of the main body of projector 111. For example, the following way may be used. That is, support plate 121 as a support mechanism is fastened to the top surface of the main body of projector 111, and projection direction change device 1 is attached to screw hole 123 provided in support plate 121 with a screw. For ground-installed projector 111 horizontally placed, like projector system 110 C shown in modified example 3 of FIG. 13, projection direction change device 1 may be fastened to the top and bottom surfaces of the main body of projector 111 or of frame 111b.

In the above-described embodiment, mirror 26 of projection direction change device 1 has a shape where the region opposite to projection lens unit 113 is larger than that closer to projection lens unit 113, but the disclosure is not limited to this embodiment. The region opposite to projection lens unit 113 may be the same in size as that closer to projection lens unit 113. Mirror 26 may be a rectangle for example.

Hereinbefore, the embodiments are described to exemplify the technology disclosed in this application. For this reason, the accompanying drawings and detailed descriptions are provided. Accordingly, some components described in the detailed descriptions and accompanying drawings may include, besides what is essential for solving problems, what is not essential in order to exemplify the above-described technologies. Hence, the fact that such inessential components are included in the detailed descriptions and accompanying drawings does not mean that such inessential components are immediately acknowledged as essential.

The above-described embodiments are for exemplification of the technologies in the disclosure. Hence, the embodiments may undergo various kinds of change, substitution, addition, and/or omission within the scope of the claims and their equivalent technology. Besides, some components described above can be combined to create a new embodiment.

Overview of Exemplary Embodiments (1) A projection direction change device of the present disclosure includes a mirror that reflects light emitted from a projection lens unit of a projector; a mirror support part that rotatably supports the mirror around a first axis and a second axis; a first drive part that rotary drives the mirror around the first axis; and a second drive part that rotary drives the mirror around the second axis. Aa intersecting point of the first and second axes is positioned closer to the projection lens unit than a geometric barycenter of the mirror is.

Due to this configuration, the intersecting point of the first and second axes is positioned closer to the projection lens unit than the geometric barycenter of the mirror is. This can shorten than before the distance from the region of the mirror opposite to the projection lens unit to the projection lens unit even if the projection lens unit is spaced from the intersecting point of the two rotation axes to the degree that the end of the mirror closer to the projection lens unit does not interfere with the projection lens unit. This can suppress an increase of the size of an image projected into the region of the mirror opposite to the projection lens unit. This increases the rotation angle of the mirror to increase the range of changing projection directions of light from the projection lens unit, and the mirror can be downsized, as well as the projection direction change device and the image projection system.

(2) The projection direction change device of (1) includes a mirror frame to which the mirror is attached. The mirror support part rotatably supports the mirror frame to which the mirror has been attached around the first and second axes. Weight balance of the mirror frame has been adjusted so that a barycenter of the mirror frame to which the mirror has been attached is positioned closer to the intersecting point of the first and second axes than the geometric barycenter of the mirror is.

These configurations can reduce drive loads while the mirror and the mirror frame are rotary driven.

(3) In the projection direction change device of (2), the weight balance of the mirror frame has been adjusted so that the barycenter of the mirror frame to which the mirror has been attached is positioned at the intersecting point of the first and second axes.

These configurations minimize the drive load while the mirror and mirror frame are rotary driven.

(4) In the projection direction change device of (3), the mirror frame includes a rib for adjusting the weight balance.

(5) In the projection direction change device of any one of (2) to (4), the mirror frame has a through hole for adjusting the weight balance.

(6) In the projection direction change device of any one of (1) to (5), the mirror has a hexagonal shape in which a side closer to the projection lens unit is shorter than a side that is opposite to the projection lens unit and is counter to the side closer to the projection lens unit.

(7) The projection direction change device of any one of (1) to (6) includes a mirror controller that indicates a drive amount of the mirror to the first and second drive parts.

(8) The projection direction change device of (7) includes an attitude sensor that detects a state of an attitude of the mirror. The mirror controller adjusts a drive amount of the mirror based on the state of an attitude.

(9) The projection direction change device of any one of (1) to (8) includes a position adjustment mechanism that allows the mirror to be displaced along a direction of projection from the projection lens unit.

(10) An image projection system of the present disclosure includes the projection direction change device of (7) or (8); the projector that projects an image; an image output device that outputs an image to the projector; and a controller that sends a command signal about the attitude of the mirror to the mirror controller and outputs an image output signal synchronized with the command signal to the image output device.

(11) In the image projection system of (10), the projector includes a lens driver that moves some or all lenses in the projection lens unit along or in parallel with a projection direction. The lens driver adjusts a projection function of the projector in collaboration with drive control of the mirror of the projection direction change device based on a command signal from the controller.

(12) In the image projection system of (11), the lens driver performs zoom adjustment of the projection lens unit.

(13) In the image projection system of (11), the lens driver performs focus adjustment of the projection lens unit.

(14) In the image projection system of (11), the lens driver performs shift adjustment of the projection lens unit.

The present disclosure is applicable to a projection image apparatus such as a projection direction change device or a projector.

What is claimed is:

1. A projection direction change device, comprising:
   a mirror that reflects light emitted from a projection lens unit of a projector;
   a mirror support part that rotatably supports the mirror around a first axis and a second axis;
   a first drive part that rotary drives the mirror around the first axis;
   a second drive part that rotary drives the mirror around the second axis; and
   a mirror frame to which the mirror is attached,
   wherein an intersecting point of the first and second axes is positioned closer to the projection lens unit than a geometric barycenter of the mirror is, and
   wherein weight balance of the mirror frame has been adjusted so that a barycenter of the mirror frame to which the mirror has been attached is positioned closer to the intersecting point of the first and second axes than the geometric barycenter of the mirror is.

2. The projection direction change device of claim 1, wherein the mirror support part rotatably supports the mirror frame to which the mirror has been attached around the first and second axes.

3. The projection direction change device of claim 2, wherein the weight balance of the mirror frame has been adjusted so that the barycenter of the mirror frame to which the mirror has been attached is positioned at the intersecting point of the first and second axes.

4. The projection direction change device of claim 3, wherein the mirror frame includes a rib for adjusting the weight balance.

5. The projection direction change device of claim 2, wherein the mirror frame has a through hole for adjusting the weight balance.

6. The projection direction change device of claim 1, wherein the mirror has a hexagonal shape in which a side closer to the projection lens unit is shorter than a side that is opposite to the projection lens unit and is counter to the side closer to the projection lens unit.

7. The projection direction change device of claim 1, further comprising a mirror controller that indicates a drive amount of the mirror to the first and second drive parts.

8. The projection direction change device of claim 7, further comprising an attitude sensor that detects a state of an attitude of the mirror,
   wherein the mirror controller adjusts a drive amount of the mirror based on the state of an attitude.

9. The projection direction change device of claim 1, further comprising a position adjustment mechanism that allows the mirror to be displaced along a direction of projection from the projection lens unit.

10. An image projection system comprising:
    the projection direction change device of claim 7;
    the projector that projects an image;
    an image output device that outputs an image to the projector; and
    a controller that sends a command signal about the attitude of the mirror to the mirror controller and outputs an image output signal synchronized with the command signal to the image output device.

11. The image projection system of claim 10,
    wherein the projector includes a lens driver that moves some or all lenses in the projection lens unit along or in parallel with a projection direction, and
    wherein the lens driver adjusts a projection function of the projector in collaboration with drive control of the mirror of the projection direction change device based on a command signal from the controller.

12. The image projection system of claim 11, wherein the lens driver performs zoom adjustment of the projection lens unit.

13. The image projection system of claim 11, wherein the lens driver performs focus adjustment of the projection lens unit.

14. The image projection system of claim 11, wherein the lens driver performs shift adjustment of the projection lens unit.

* * * * *